(12) United States Patent
Anand et al.

(10) Patent No.: US 6,233,916 B1
(45) Date of Patent: May 22, 2001

(54) METHOD OF USING FUEL GAS EXPANDER IN POWER GENERATING PLANTS

(75) Inventors: Ashok Kumar Anand, Niskayuna; Raub Warfield Smith, Ballston Lake, both of NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/661,641

(22) Filed: Sep. 13, 2000

Related U.S. Application Data

(62) Division of application No. 09/106,499, filed on Jun. 29, 1998.

(51) Int. Cl.[7] ............................................. F02G 3/00
(52) U.S. Cl. .................... 60/39.07; 39/39.465; 39/736
(58) Field of Search .......................... 60/39.182, 39.465, 60/734, 736, 39.07, 39.12

(56) References Cited

U.S. PATENT DOCUMENTS

| | | | |
|---|---|---|---|
| 4,058,974 | * 11/1977 | Pfenninger | 60/39.12 |
| 5,161,365 | * 11/1992 | Wright | 60/736 X |
| 5,337,554 | * 8/1994 | Bertels | 60/39.465 X |
| 5,517,815 | * 5/1996 | Fujioka et al. | 60/39.12 |
| 5,581,128 | * 12/1996 | Royle | 60/39.12 X |
| 5,822,974 | * 10/1998 | McGowin et al. | 60/39.182 |
| 5,918,466 | * 7/1999 | Cloyd et al. | 60/39.12 X |
| 5,955,039 | * 9/1999 | Dowdy | 60/39.12 X |

* cited by examiner

Primary Examiner—Timothy S. Thorpe
Assistant Examiner—David J. Torrente
(74) Attorney, Agent, or Firm—Nixon & Vanderhye

(57) ABSTRACT

In a power generating plant which utilizes fuel gas for combustion at a predetermined pressure to drive a primary load, and where the fuel gas is supplied at a pressure higher than the predetermined pressure, an improvement is provided wherein a fuel gas expander is located downstream of a source of the fuel gas and upstream of a combustor for decreasing the pressure of the fuel gas, and wherein excess energy from the expander is used to drive a secondary load.

8 Claims, 3 Drawing Sheets

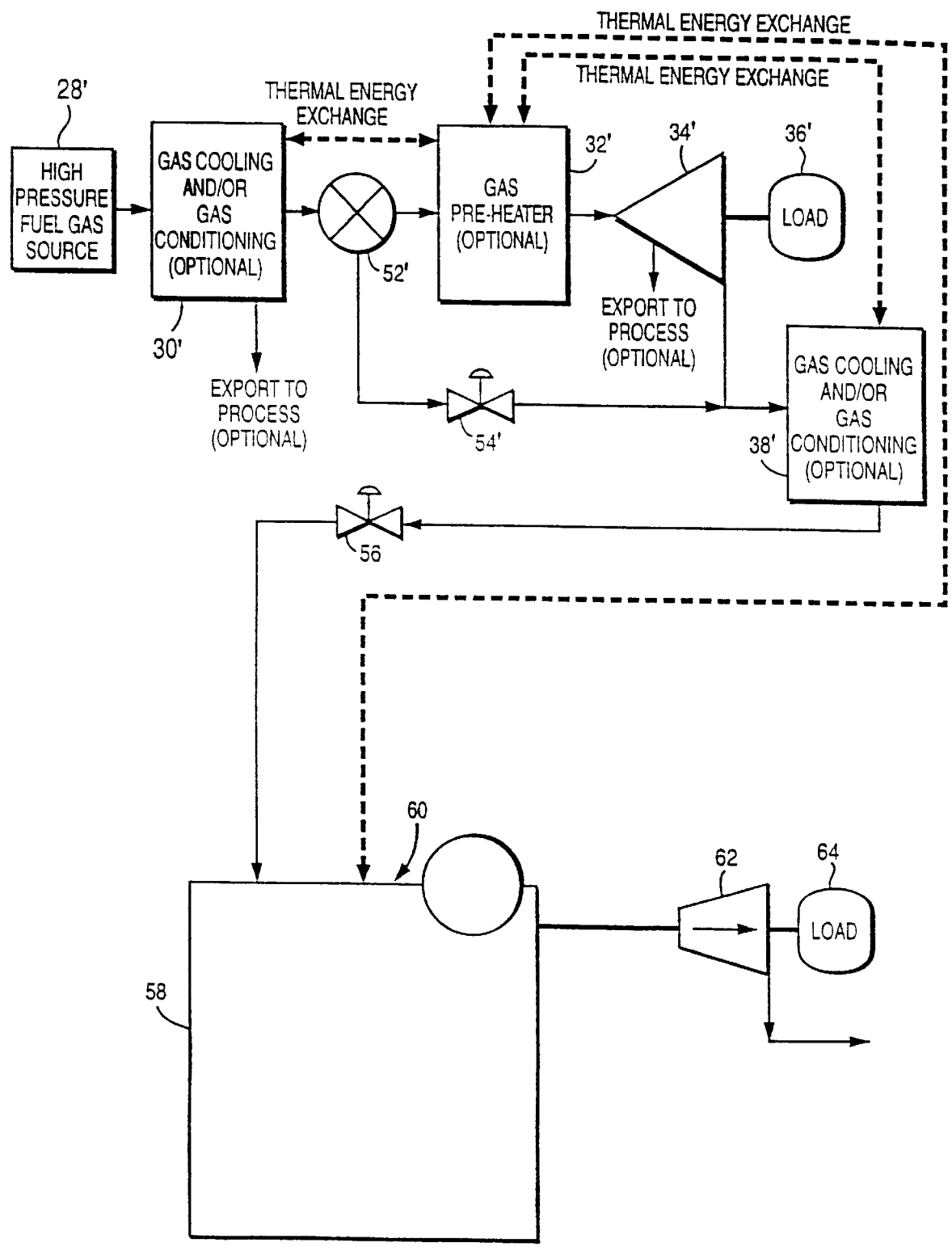

METHOD OF USING FUEL GAS EXPANDER IN POWER GENERATING PLANTS

This is a divisional application of application Ser. No. 09/106,499, filed Jun. 29, 1998, now allowed, the entire content of which is hereby incorporated by reference in this application.

TECHNICAL FIELD

This invention relates to power generating plants generally, and more specifically, to the use of a fuel gas expander for reducing fuel gas pressure in a power generating plant.

BACKGROUND

Fuel gas used in power generating plants is available, in many situations, at much higher pressure than is needed for combustion in the power generating equipment. The source of high pressure fuel gas for power generation may be a natural gas pipeline, pressurized fuel conversion gasifier, a chemical process plant, or any other high pressure combustible gas generating equipment. Usually, the fuel gas pressure needs to be reduced and controlled to the level required for stable combustion in the power generating combustion equipment, such as the combustor in a gas turbine generator, or a fuel burner in a waste heat boiler and fully fired boiler turbine generator, etc. Typically, pressure reduction is achieved by throttling the fuel gas, but this is not particularly efficient since it does not make use of the fuel gas pressure differential.

DISCLOSURE OF THE INVENTION

In accordance with this invention, a fuel gas expander device is utilized in a power generation plant, and utilizes the difference between the fuel gas source pressure and the combustor/burner pressure in the power generating plant, resulting in improved power output and efficiency of the plant.

In one exemplary embodiment, one or more fuel gas expanders are used in a gas turbine, combined cycle power generating plant. Specifically, the fuel gas from a high pressure fuel gas source is introduced into a fuel gas expander prior to introduction into the combustor of the gas turbine. The excess pressure between the high pressure fuel gas and the lower pressure fuel gas exiting the fuel gas expander may be employed to drive a load such as a generator, compressor or other component. Optionally, the fuel gas can be cooled and/or conditioned if required prior to introduction into the fuel gas expander in order to remove any solid particles or harmful contaminants which may adversely effect the continued operation and/or reduce the blade life of the expander.

The fuel gas can then, also optionally, be heated in a heat exchanger to a temperature higher than the minimum required to avoid any undesirable fluid condensation or deposition in the expander equipment. The source of this heat can be thermal energy recovered either upstream (for example, from a gasifier with a high temperature cooler) or downstream (for example, from the exhaust gas heat recovered from the gas turbine exhaust in a waste heat boiler) of the expander.

The fuel gas may be expanded further in a second fuel gas expander if the fuel is to be used at two pressure levels, for example, where it is first expanded to an intermediate pressure level suitable for the gas turbine combustor, with a portion further expanded to an even lower pressure in a separate fuel gas expander prior to introduction as a supplemental fuel in the fuel burner of a waste heat or fully fired boiler.

It is further contemplated that a portion of the fuel gas may be bypassed around the first fuel gas expander via a throttling device to combine with the discharge stream from the expander to continue plant operation during start-up, shutdown, or during other events when the expander is not operating.

In another exemplary embodiment of the invention, a similar fuel gas expander setup is employed in connection with a fuel burner in a fully fired boiler turbo-expander (typically steam) power plant.

In its broader aspects therefore, the present invention provides, in a power generating plant which utilizes fuel gas for combustion at a predetermined pressure to drive a primary load, and where the fuel gas is supplied at pressure higher than the predetermined pressure, an improvement including at least one fuel gas expander located downstream of a source of the fuel gas and upstream of a combustor, the fuel gas expander decreasing the pressure of the fuel gas below the higher pressure; and wherein excess energy resulting from a differential between the predetermined pressure and the higher pressure is used to drive a secondary load.

Other objects and advantages of the subject invention will become apparent from the detailed description which follows.

BRIEF DESCRIPTION OF THE DRAWINGS

FIG. 2 is a schematic diagram of a fuel gas expander in a fully fired boiler turbo-expander power plant in accordance with a second exemplary embodiment of the invention.

BEST MODE FOR CARRYING OUT THE INVENTION

Figure 1:
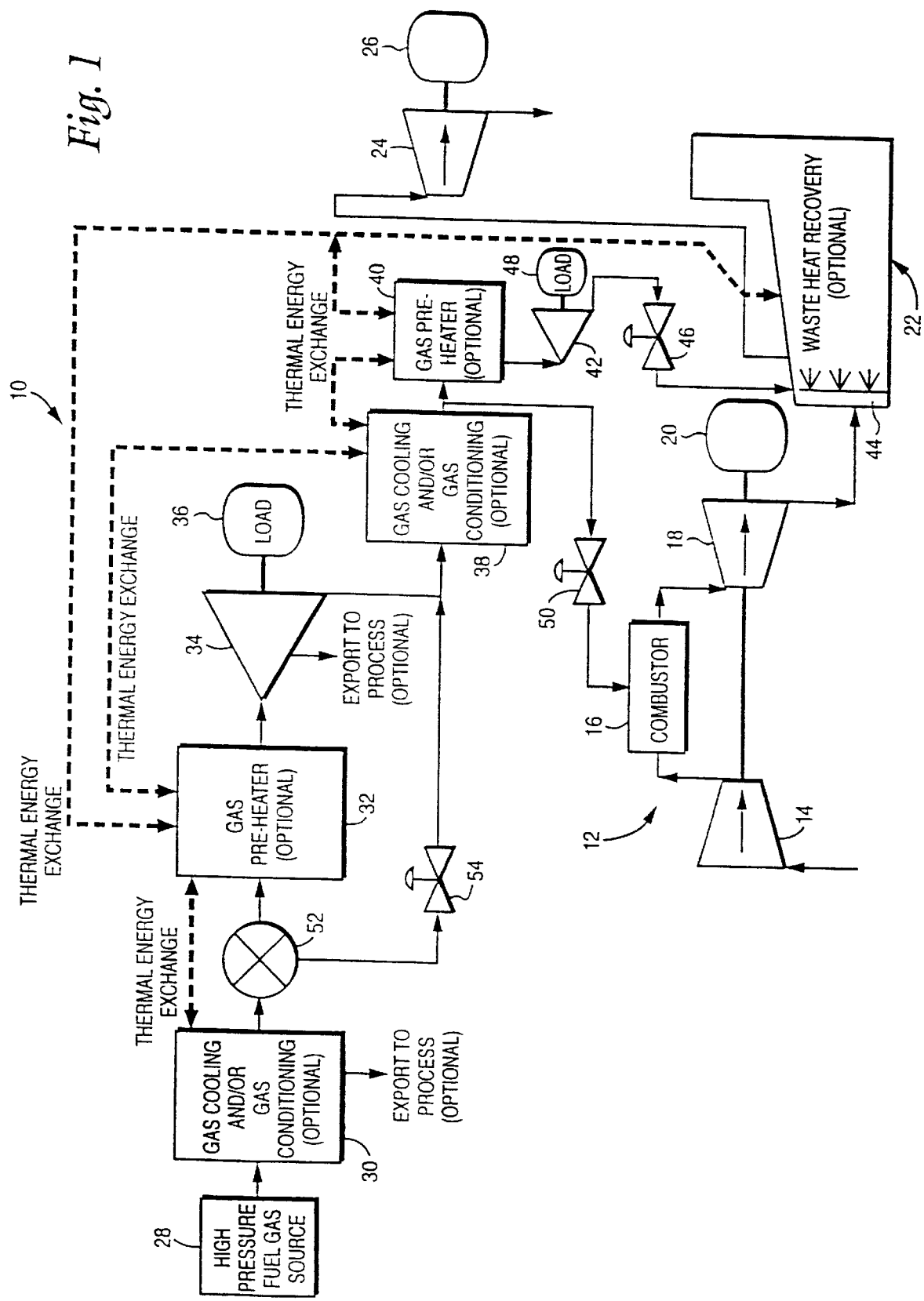
FIG. 1 is a schematic diagram illustrating the use of a fuel gas expander in a gas turbine/combined cycle power generating plant in accordance with the first exemplary embodiment of the invention.

With reference to FIG. 1, a combined cycle gas/stream turbine system 10 is shown in schematic from. Generally, the gas turbine 12 includes a compressor section 14, a combustor 16 and a turbine section 18, the latter driving a generator 20. Exhaust gas from the turbine 18 is supplied to a waste heat recovery steam generator 22 which supplies heated steam to a steam turbine 24 which drives a second generator 26.

In accordance with this invention, the fuel gas from a high pressure fuel gas source 28 is reduced in pressure in a fuel gas expander 34 prior to introduction into the combustor 16 of the gas turbine 12. Depending on particular circumstances, the fuel gas maybe introduced into gas cooling and/or gas conditioning equipment 30, employed, if necessary, to remove any solid particles and/or contaminants from the fuel gas prior to introduction into the fuel gas expander 34. Some portion of the fuel gas may be extracted from the conditioning equipment 30 if desired. The fuel gas may also (again, optionally) be pre-heated in an exchanger 32, also upstream of the expander. The pre-heated 32 or exchanger can receive heat energy for the exchange from a source upstream of the expander 34 such as the cooling and/or conditioning equipment 30, or from a source downstream of the expander 34, such as the optional gas cooling/ conditioning equipment 38 (discussed further below), or from exhaust gas heat recovered from the gas turbine exhaust in the waste heat recovery generator 22. In some cases, the source of heat will includes partial conversion of a fuel gas to chemical energy (for example, thermal energy produced during shift reaction of synthetic fuel gas containing carbon monoxide and water vapors to carbon dioxide and hydrogen).

In the expander 34, the fuel gas pressure is reduced to a level required by the gas turbine 12, and excess energy (the difference between the fuel gas source pressure and the combustor/burner pressure) is used to drive a secondary load (a generator or other equipment) 36. Optionally, a portion of fuel gas may be extracted from the expander and exported to a process application.

With further reference to FIG. 1, the fuel gas may also be expanded in a second expander 42 downstream of the first expander 34. As in the case of the first expander, the fuel gas may flow through the second gas cooling/conditioning component 38, and/or a pre-heater 40 prior to introduction into the expander 42. This arrangement is useful where fuel gas is used at two pressure levels, i.e., where it is first expanded to an intermediate pressure level in the expander 34, suitable for combustion in the gas turbine 12, with a portion of the expanded fuel gas further expanded to an even lower pressure in the second fuel gas expander 42, for introduction as a supplemental fuel in the fuel burner 44 of the waste heat recovery generator 22, via fuel control valve 46. Excess energy from the second expander 40 may then be used to drive a tertiary load 48.

The pre-heater 40, if used, may be in heat exchanger relationship with the cooling/conditioning equipment 38 and /or the waste heat recovery generator 22, in a manner similar to that of the pre-heater 32 as described above. The main portion of the fuel gas is introduced into the gas turbine combustor 16 via fuel control valve 50.

FIG. 1 also illustrates an optional bypass where some fuel can be diverted upstream of the expander 34 (and pre-heater 32 if used) by way of bypass valve 52, for introduction into the discharge stream from the expander 34 via fuel control valve 54. This bypass arrangement enables plant operation during start-up, shut down, and other events where the expander 34 is not operating.

Figure 1A:
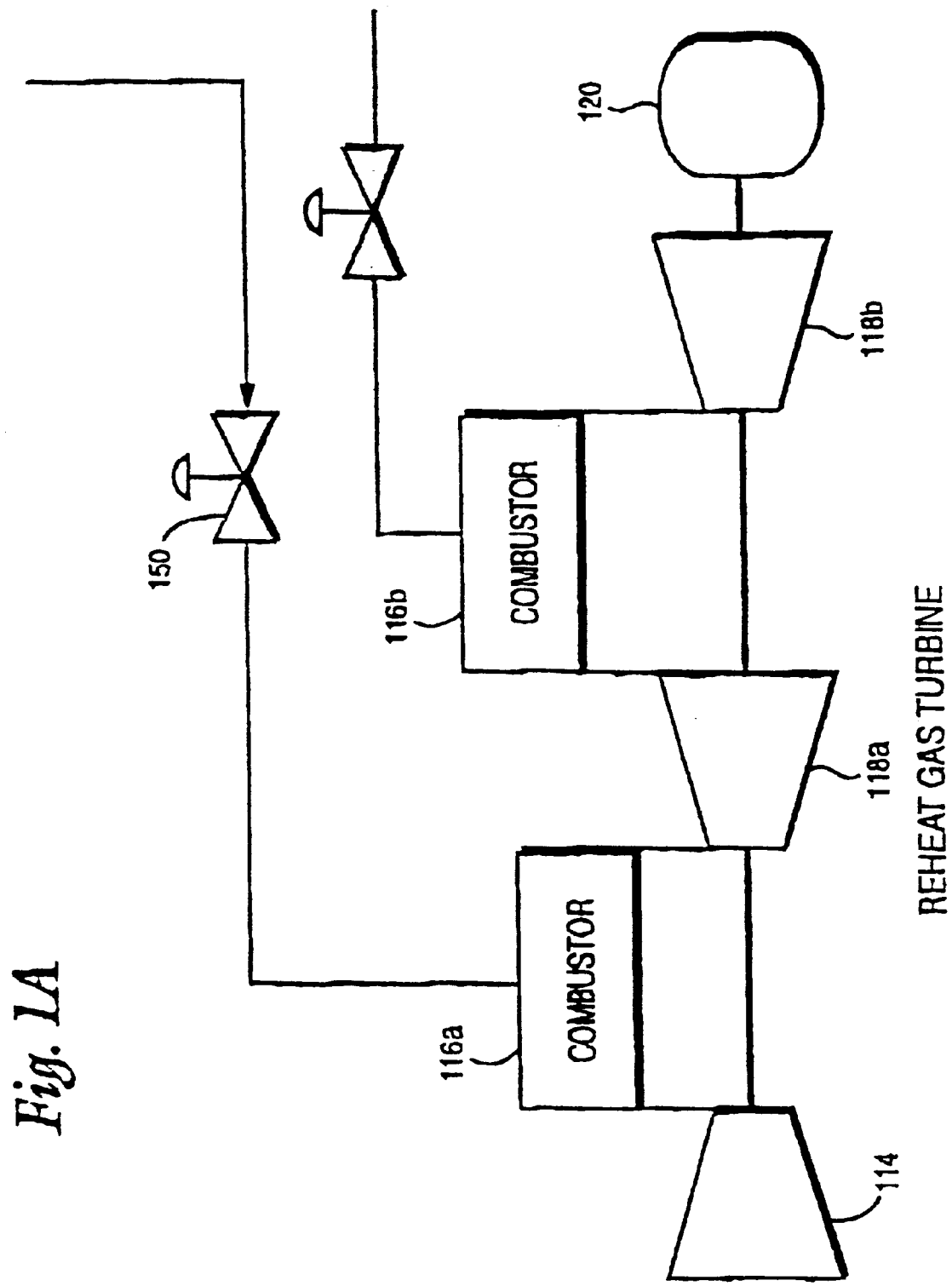
FIG. 1A is a schematic diagram illustrating a variation in the arrangement shown in FIG. 1.

FIG. 1A illustrates an alternative arrangement where reduced pressure fuel gas controlled by valve 150 (corresponding to valve 50 in FIG. 1) is introduced into a lower pressure gas turbine combustor 116A of a multi-combustion (reheat) gas turbine cycle which also include compressor 114, turbine sections 118A and 118B and a second combustor 116B, with the reheat turbine driving a generator 120. If necessary, a third fuel gas expander may be incorporated into the system upstream of the control valve 152 with or without additional extractions, depending on specific process applications.

Turning now to FIG. 2, a second embodiment of the invention is schematically shown which is generally similar to that shown in FIG. 1 up to and including the gas cooling and/or conditioning equipment 38'. For convenience, therefore, similar reference numerals with a "prime" designation added, are used to indicate corresponding components, which need not be described gain here. In this second embodiment, however, fuel gas from the equipment 38' is introduced via flow control throttle 56 to a fuel burner 58 in a fully fired boiler 60 which supplies steam to a turboexpander 62 which, in turn, drives a generator or other load 64. The preheater 32' can receive heat energy for the exchange from a source upstream of the expander 34' such as the cooling and/or conditioning equipment 30, or from a source downstream of the expander 34', such as the optional gas cooling/conditioning equipment 38' or from exhaust gas heat recovered from fully fired boiler 60.

It will be appreciated from the above described embodiments of the invention that excess fuel gas pressure, over and above that which is necessary for its principal intended use, may be employed to drive other related equipment in a power generating plant, thereby improving the overall efficiency of the system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power generating plant comprising a fully fired boiler that utilizes fuel gas for combustion in a fuel burner of the boiler at a predetermined pressure to drive a primary load, and where the fuel gas is supplied at a pressure higher than the predetermined pressure; at least one fuel gas expander located downstream of a source of the fuel gas and upstream of the fuel burner, said fuel gas expander decreasing the pressure of the fuel gas below said higher pressure, and wherein excess energy resulting from a differential between said predetermined pressure and said higher pressure is used to drive a secondary load that is otherwise independent of the power cycle.

2. The power generating plant of claim 1 wherein a turbo-expander is arranged between said boiler and said primary load.

3. The improvement of claim 1 wherein the fuel gas is supplied to a gas cooling component upstream of the gas expander.

4. The improvement of claim 1 wherein the fuel gas is introduced into a pre-heater upstream of the gas expander.

5. The improvement of claim 1 wherein the fuel gas from said expander is introduced into a second gas cooling component downstream of said expander and upstream of the fuel burner.

6. The improvement of claim 1 wherein fuel gas from said expander is introduced into a second gas conditioning component downstream of said expander and upstream of the fuel burner.

7. The improvement of claim 1 wherein a portion of fuel gas from said expander is extracted and exported to a process application.

8. The improved of claim 4 wherein said preheater is in heat exchanger relationship with said boiler.

* * * * *

UNITED STATES PATENT AND TRADEMARK OFFICE
CERTIFICATE OF CORRECTION

PATENT NO. : 6,233,916 B1　　　　　　　　　　　　　　　　　　　　　　Page 1 of 1
APPLICATION NO. : 09/661641
DATED : May 22, 2001
INVENTOR(S) : Anand et al.

It is certified that error appears in the above-identified patent and that said Letters Patent is hereby corrected as shown below:

Column 1, line 18 (application page 3, line 10), delete "at pressure" and insert --at a pressure--.

Column 2, line 46 (application page 4, line 8), delete "from" and insert --form--.

Column 2, line 64 (application page 4, line 21), delete "pre-heated" and insert --pre-heater--.

Column 4, line 42 (claim 3), delete "improvement" and insert --power generating plant--.

Column 4, line 45 (claim 4), delete "improvement" and insert --power generating plant--.

Column 4, line 47 (claim 5), delete "improvement" and insert --power generating plant--.

Column 4, line 51 (claim 6), delete "improvement" and insert --power generating plant--.

Column 4, line 55 (claim 7), delete "improvement" and insert --power generating plant--.

Column 4, line 58 (claim 8), delete "improvement" and insert --power generating plant--.

Column 4, line 59 (claim 8), delete "exchanger" and insert --exchange--.

Signed and Sealed this

Fifth Day of May, 2009

JOHN DOLL
*Acting Director of the United States Patent and Trademark Office*